(12) United States Patent
Arakawa (10) Patent No.: US 6,624,439 B1
(45) Date of Patent: Sep. 23, 2003

(54) ENERGY SUBTRACTION PROCESSING METHOD AND APPARATUS FOR DATA STORED IN STIMULABLE PHOSPHOR MATERIALS

(75) Inventor: Satoshi Arakawa, Kaisei-machi (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 0 days.

(21) Appl. No.: 09/540,983

(22) Filed: Mar. 31, 2000

(30) Foreign Application Priority Data

Mar. 31, 1999 (JP) .......................................... 11-092259

(51) Int. Cl.[7] ......................... G01N 23/04; G11B 7/135
(52) U.S. Cl. ...................................... 250/586; 250/587
(58) Field of Search .................................. 250/587, 586

(56) References Cited

U.S. PATENT DOCUMENTS

| | | | | |
|---|---|---|---|---|
| 4,855,598 A | * | 8/1989 | Ohgoda et al. | 250/582 |
| 4,931,642 A | * | 6/1990 | Hosoi et al. | 250/586 |
| 4,950,907 A | * | 8/1990 | Kuhn | 250/484.4 |
| 5,038,037 A | * | 8/1991 | Saotome et al. | 250/583 |
| 5,376,801 A | * | 12/1994 | Saotome et al. | 250/482.1 |
| 5,477,059 A | * | 12/1995 | Arakawa | 250/587 |
| 5,550,385 A |   | 8/1996 | Nanami et al. | |
| 5,852,301 A | * | 12/1998 | Niimura et al. | 250/583 |

FOREIGN PATENT DOCUMENTS

EP           0658777 A2   *   6/1995   ............. G01T/1/29

* cited by examiner

Primary Examiner—Ricky Mack
Assistant Examiner—Alicia M Harrington
(74) Attorney, Agent, or Firm—Sughrue Mion, PLLC

(57) ABSTRACT

At least two stimulable phosphor sheets are superposed with an energy separation filter, which absorbs low energy components of radiation, intervening therebetween and are exposed to radiation carrying image information of an object, and radiation images of the object are stored on the sheets. A first image signal is detected from a first sheet located on the side close to the object. A stimulable phosphor sheet, which allows detection of two image signals from its opposite surfaces, is utilized as a second sheet located on the side remote from the object. An addition process is performed on a front surface side image signal, which has been detected from a front surface of the second sheet, and a back surface side image signal, which has been detected from a back surface of the second sheet, in order to obtain a second image signal. A subtraction process is performed on the first image signal and the thus obtained second image signal, and an energy subtraction image signal is thereby obtained.

17 Claims, 4 Drawing Sheets

| FREQUENCY (c/mm) | | 0 | 0.5 | 1 | 1.5 | 2 | 2.5 | 3 | 5 |
|---|---|---|---|---|---|---|---|---|---|
| FIRST STIMULABLE PHOSPHOR SHEET | FRONT SURFACE SIDE IMAGE SIGNAL Q1 | 0.48 | 0.49 | 0.55 | 0.67 | 0.78 | 0.84 | 0.89 | 1.00 |
| | BACK SURFACE SIDE IMAGE SIGNAL Q2 | 0.52 | 0.51 | 0.45 | 0.33 | 0.22 | 0.16 | 0.11 | 0.00 |
| SECOND STIMULABLE PHOSPHOR SHEET | FRONT SURFACE SIDE IMAGE SIGNAL Q1 | 0.30 | 0.35 | 0.42 | 0.52 | 0.61 | 0.74 | 0.85 | 1.00 |
| | BACK SURFACE SIDE IMAGE SIGNAL Q2 | 0.70 | 0.65 | 0.58 | 0.48 | 0.39 | 0.26 | 0.15 | 0.00 |

ENERGY SUBTRACTION PROCESSING METHOD AND APPARATUS FOR DATA STORED IN STIMULABLE PHOSPHOR MATERIALS

BACKGROUND OF THE INVENTION

1. Field of the Invention

This invention relates to an energy subtraction processing method and apparatus, wherein a subtraction process is performed on image signals representing radiation images of an object, which radiation images have been stored on stimulable phosphor sheets, and an image in which only an image pattern of a specific structure of the object, or the like, is thereby obtained.

2. Description of the Prior Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

Also, energy subtraction processing techniques for radiation images have heretofore been known. With the energy subtraction processing techniques, at least two stimulable phosphor sheets are superposed one upon the other with an energy separation filter, which absorbs low energy components of radiation, intervening therebetween. The stimulable phosphor sheets are then exposed simultaneously to radiation carrying image information of an object, which is composed of a plurality of structures having different radiation energy absorption characteristics. In this manner, two radiation images of the object are stored respectively on the stimulable phosphor sheets. Thereafter, a subtraction process is performed on a first image signal, which represents a first radiation image having been stored on a first stimulable phosphor sheet located on the side close to the object, and a second image signal, which represents a second radiation image having been stored on a second stimulable phosphor sheet located on the side remote from the object. Specifically, the image signal components of the first image signal and the second image signal, which image signal components represent corresponding pixels in the first and second radiation images, are subtracted from each other. An energy subtraction image signal representing an energy subtraction image, in which an image pattern of only a specific structure or part of the object is illustrated, is thereby obtained.

In the energy subtraction processing techniques described above, such characteristics are utilized that a plurality of structures of an object, e.g. a bone and a soft tissue of a human body, exhibit different levels of radiation absorptivity with respect to radiation with different energy distributions. By the utilization of such characteristics, a plurality of radiation images are formed with several kinds of radiation with different energy distributions. Thereafter, the image signals representing the plurality of the radiation images are weighted appropriately and subjected to a subtraction process in order to extract an image of a specific structure, e.g. an image of a bone or an image of a soft tissue. The energy subtraction processing techniques are proposed in, for example, U.S. Pat. Nos. 4,855,598 and 4,896,037.

However, with the energy subtraction processing techniques described above, the radiation having passed through the first stimulable phosphor sheet, which is located on the side close to aradiation source, and having then passed through the energy separation filter impinges upon the second stimulable phosphor sheet, which is located on the side remote from the radiation source. Therefore, a comparatively small amount of radiation impinges upon the second stimulable phosphor sheet. As a result, the second image signal having been detected from the second stimulable phosphor sheet has a low signal-to-noise ratio. In cases where the subtraction process is performed by utilizing the second image signal having a low signal-to-noise ratio, an energy subtraction image signal having a low signal-to-noise ratio is obtained from the subtraction process. Accordingly, the problems occur in that an energy subtraction image having good image quality cannot be obtained. The problems become worse particularly in cases where an image recording operation is to be performed with a restricted dose of radiation.

SUMMARY OF THE INVENTION

The primary object of the present invention is to provide an energy subtraction processing method for performing a subtraction process on image signals representing radiation images of an object, which radiation images have been stored on stimulable phosphor sheets, wherein problems with regard to a low signal-to-noise ratio of an image signal having been detected from a stimulable phosphor sheet, which is located on the side remote from a radiation source, are eliminated, and an energy subtraction image having good image quality is capable of being obtained.

Another object of the present invention is to provide an apparatus for carrying out the energy subtraction processing method.

The present invention provides an energy subtraction processing method, wherein at least two stimulable phosphor sheets are superposed one upon the other with an energy separation filter, which absorbs low energy components of radiation, intervening therebetween and are then exposed simultaneously to radiation carrying image information of an object, which is composed of a plurality of structures having different radiation energy absorption characteristics, radiation images of the object are thus stored respectively on the stimulable phosphor sheets, and a subtraction process is performed on a first image signal, which has been detected by reading out a first radiation image having been stored on a first stimulable phosphor sheet located on the side close to the object, and a second image signal, which has been detected by reading out a second radiation image having been stored on a second stimulable phosphor sheet located on the side remote from the object, an energy subtraction image signal being thereby obtained, the method comprising the steps of:

i) utilizing a stimulable phosphor sheet, which allows detection of two image signals from its opposite surfaces, as the second stimulable phosphor sheet, ii) performing an addition process on a front surface side image signal, which has been detected by reading out the second radiation image from a front surface of the second stimulable phosphor sheet, and a back surface side image signal, which has been detected by reading out the second radiation image from a back surface of the second stimulable phosphor sheet, in order to obtain the second image signal, and iii) performing the subtraction process on the first image signal and the thus obtained second image signal.

In the energy subtraction processing method in accordance with the present invention, the first stimulable phosphor sheet may be a stimulable phosphor sheet, which allows detection of an image signal from its one surface alone, and the first image signal may be an image signal having been detected by reading out the first radiation image from the first stimulable phosphor sheet, which allows detection of an image signal from its one surface alone.

Alternatively, in the energy subtraction processing method in accordance with the present invention, the first stimulable phosphor sheet may be a stimulable phosphor sheet, which allows detection of two image signals from its opposite surfaces, and the first image signal may be an image signal having been detected by reading out the first radiation image from the front surface of the stimulable phosphor sheet, which allows detection of two image signals from its opposite surfaces.

As another alternative, in the energy subtraction processing method in accordance with the present invention, the first stimulable phosphor sheet may be a stimulable phosphor sheet, which allows detection of two image signals from its opposite surfaces, and the first image signal may be an image signal obtained from an addition process performed on a front surface side image signal having been detected by reading out the first radiation image from a front surface of the first stimulable phosphor sheet, which allows detection of two image signals from its opposite surfaces, and a back surface side image signal having been detected by reading out the first radiation image from a back surface of the first stimulable phosphor sheet, which allows detection of two image signals from its opposite surfaces.

Also, in the energy subtraction processing method in accordance with the present invention, a thickness of a stimulable phosphor layer of the second stimulable phosphor sheet may be larger than the thickness of the stimulable phosphor layer of the first stimulable phosphor sheet.

The energy subtraction processing method in accordance with the present invention, wherein each of the first image signal and the second image signal is obtained from the addition process performed on the corresponding front surface side image signal and the corresponding back surface side image signal, may be modified such that at least three stimulable phosphor sheets, each of which allows detection of two image signals from its opposite surfaces, are utilized, an operation for recording the radiation images of the object is performed by utilizing two stimulable phosphor sheets, which are among the at least three stimulable phosphor sheets, and an operation for reading out a radiation image from a stimulable phosphor sheet, which is among the at least three stimulable phosphor sheets and on which a radiation image of an object has been recorded previously, is performed simultaneously with the operation for recording the radiation images of the object by utilizing the two stimulable phosphor sheets, which are among the at least three stimulable phosphor sheets.

Also, the energy subtraction processing method in accordance with the present invention, wherein each of the first image signal and the second image signal is obtained from the addition process performed on the corresponding front surface side image signal and the corresponding back surface side image signal, may be modified such that an addition ratio of the front surface side image signal in the addition process, which is performed on the front surface side image signal and the back surface side image signal having been detected from the first stimulable phosphor sheet, is higher than an addition ratio of the front surface side image signal in the addition process, which is performed on the front surface side image signal and the back surface side image signal having been detected from the second stimulable phosphor sheet, and the first image signal and the second image signal are thereby obtained.

The present invention also provides an apparatus for carrying out the energy subtraction processing method in accordance with the present invention. Specifically, the present invention also provides an energy subtraction processing apparatus, comprising:

i) an image recording section for simultaneously exposing at least two stimulable phosphor sheets to radiation carrying image information of an object in order to record radiation images of the object respectively on the stimulable phosphor sheets, the image recording section being constituted such that a first stimulable phosphor sheet is located on the side close to the object, a second stimulable phosphor sheet, which allows detection of two image signals from its opposite surfaces, is located on the side remote from the object, and an energy separation filter, which absorbs low energy components of radiation, intervenes between the first stimulable phosphor sheet and the second stimulable phosphor sheet, and such that the first stimulable phosphor sheet, the second stimulable phosphor sheet, and the energy separation filter intervening therebetween are superposed one upon another, ii) an image read-out section for reading out a first radiation image from the first stimulable phosphor sheet in order to obtain a first image signal, reading out a second radiation image from a front surface and a back surface of the second stimulable phosphor sheet in order to obtain a front surface side image signal and a back surface side image signal, and performing an addition process on the front surface side image signal and the back surface side image signal in order to obtain a second image signal, and iii) an operation processing section for performing a subtraction process on the first image signal and the second image signal in order to obtain an energy subtraction image signal.

The energy subtraction processing apparatus in accordance with the present invention may be modified such that each of the at least two stimulable phosphor sheets is a stimulable phosphor sheet, which allows detection of two image signals from its opposite surfaces, and the image read-out section performs:

a) an operation for reading out the first radiation image from a front surface and a back surface of the first stimulable phosphor sheet in order to obtain a front surface side image signal and a back surface side image signal, and performing an addition process on the front surface side image signal and the back surface side image signal in order to obtain the first image signal, and b) an operation for reading out the second radiation image from the front surface and the back surface of the second stimulable phosphor sheet in order to obtain the front surface side image signal and the back surface side image signal, and performing the addition process on the front surface side image signal and the back surface side image signal in order to obtain the second image signal.

The energy subtraction processing apparatus in accordance with the present invention, wherein each of the first image signal and the second image signal is obtained from the addition process performed on the corresponding front surface side image signal and the corresponding back surface side image signal, may be modified such that at least three stimulable phosphor sheets, each of which allows detection of two image signals from its opposite surfaces, are utilized, an operation for recording the radiation images of the object is performed by utilizing two stimulable phosphor sheets, which are among the at least three stimulable phosphor sheets, and an operation for reading out a radiation image from a stimulable phosphor sheet, which is among the at least three stimulable phosphor sheets and on which a radiation image of an object has been recorded previously, is performed simultaneously with the operation for recording the radiation images of the object by utilizing the two stimulable phosphor sheets, which are among the at least three stimulable phosphor sheets.

Also, the energy subtraction processing apparatus in accordance with the present invention, wherein each of the first image signal and the second image signal is obtained from the addition process performed on the corresponding front surface side image signal and the corresponding back surface side image signal, may be modified such that, in the image read-out section, an addition ratio of the front surface side image signal in the addition process, which is performed on the front surface side image signal and the back surface side image signal having been detected from the first stimulable phosphor sheet, is set at a value higher than an addition ratio of the front surface side image signal in the addition process, which is performed on the front surface side image signal and the back surface side image signal having been detected from the second stimulable phosphor sheet, and the first image signal and the second image signal are thereby obtained.

As a technique for reading out image information from a stimulable phosphor sheet, a technique for detecting two image signals from opposite surfaces of a stimulable phosphor sheet has heretofore been known, in which light emitted from the front surface of the stimulable phosphor sheet and light emitted from the back surface of the stimulable phosphor sheet are detected respectively, and two image signals are thereby detected from the opposite surfaces of the stimulable phosphor sheet. With the technique for detecting two image signals from opposite surfaces of a stimulable phosphor sheet, for example, a stimulable phosphor sheet comprising a transparent substrate and a stimulable phosphor layer overlaid on the front surface side of the transparent substrate is employed, and irradiation of stimulating rays is performed from the stimulable phosphor layer side of the stimulable phosphor sheet. When the stimulable phosphor sheet is exposed to the stimulating rays, light is emitted from each of the front surface side (i.e., the stimulable phosphor layer side) of the stimulable phosphor sheet and the back surface side (i.e., the transparent substrate side) of the stimulable phosphor sheet. The light emitted from the front surface side of the stimulable phosphor sheet and the light emitted from the back surface side of the stimulable phosphor sheet are respectively detected with photoelectric read-out means, which is located on the front surface side of the stimulable phosphor sheet, and photoelectric read-out means, which is located on the back surface side of the stimulable phosphor sheet. The technique for detecting two image signals from opposite surfaces of a stimulable phosphor sheet is disclosed in, for example, U.S. Pat. No. 4,346,295. In cases where the technique for detecting two image signals from opposite surfaces of a stimulable phosphor sheet is utilized, an addition process can be performed on the image signal components of the two image signals having been detected from the opposite surfaces of the stimulable phosphor sheet, which image signal components represent corresponding pixels on the front and back surfaces of the stimulable phosphor sheet. In this manner, the light collecting efficiency can be enhanced. Further, since noise components are uniformized, the signal-to-noise ratio of the obtained radiation image can be enhanced.

With the energy subtraction processing method and apparatus in accordance with the present invention, as described above, a stimulable phosphor sheet, which allows detection of two image signals from its opposite surfaces, is employed as the second stimulable phosphor sheet, which is located on the side remote from the object. Also, the addition process is performed on the front surface side image signal, which has been detected from the front surface of the second stimulable phosphor sheet, and the back surface side image signal, which has been detected from the back surface of the second stimulable phosphor sheet. In this manner, the second image signal is obtained. Therefore, even if the dose of radiation impinging upon the second stimulable phosphor sheet is small, an image signal having a high signal-to-noise ratio can be obtained as the second image signal detected from the second stimulable phosphor sheet. As a result, an energy subtraction image having a high signal-to-noise ratio and good image quality can be obtained from the energy subtraction processing.

With the energy subtraction processing method and apparatus in accordance with the present invention, wherein a stimulable phosphor sheet, which allows detection of two image signals from its opposite surfaces, is also employed as the first stimulable phosphor sheet, the energy subtraction processing can be performed by utilizing a single kind of the stimulable phosphor sheets, each of which allows detection of two image signals from its opposite surfaces. Therefore, the processing and management of stimulable phosphor sheets can be kept easier than when the two kinds of the stimulable phosphor sheets (i.e., the stimulable phosphor sheet, which allows detection of an image signal from its one surface alone, and the stimulable phosphor sheet, which allows detection of two image signals from its opposite surfaces) are utilized.

Also, with the energy subtraction processing method and apparatus in accordance with the present invention, wherein a stimulable phosphor sheet, which allows detection of two image signals from its opposite surfaces, is also employed as the first stimulable phosphor sheet, the first image signal may be constituted of only the image signal detected from the front surface of the first stimulable phosphor sheet, which allows detection of two image signals from its opposite surfaces. The image signal detected from the front surface of the first stimulable phosphor sheet is the one representing the radiation image formed with the radiation, in which the proportion of the low energy components is markedly high. Therefore, in such cases, the first image signal and the second image signal can be obtained such that they represent the radiation images having been formed respectively with two kinds of radiation with well-separated different energy levels. As a result, an energy subtraction image having image quality enhanced even further can be obtained from the energy subtraction processing.

With the energy subtraction processing method and apparatus in accordance with the present invention, the thickness of the stimulable phosphor layer of the second stimulable phosphor sheet may be larger than the thickness of the stimulable phosphor layer of the first stimulable phosphor sheet. In such cases, the thickness of the stimulable phosphor layer of the first stimulable phosphor sheet located on the side close to a radiation source becomes comparatively small, and the dose of radiation after having passed through the stimulable phosphor layer of the first stimulable phosphor sheet becomes large. Also, since the thickness of the stimulable phosphor layer of the second stimulable phosphor sheet located on the side remote from the radiation source becomes comparatively large, the stimulable phosphor layer of the second stimulable phosphor sheet can efficiently absorb the incident radiation. Accordingly, the second stimulable phosphor sheet can absorb more of the radiation, and the second image signal having a signal-to-noise ratio enhanced even further can be obtained.

Further, with the energy subtraction processing method and apparatus in accordance with the present invention, at least three stimulable phosphor sheets, each of which allows detection of two image signals from its opposite surfaces, may be utilized, and the operation for recording the radiation images of the object may be performed by utilizing two stimulable phosphor sheets, which are among the at least three stimulable phosphor sheets. Also, the operation for reading out a radiation image from a stimulable phosphor sheet, which is among the at least three stimulable phosphor sheets and on which a radiation image of an object has been recorded previously, may be performed simultaneously with the operation for recording the radiation images of the object by utilizing the two stimulable phosphor sheets, which are among the at least three stimulable phosphor sheets. In such cases, since the operation for recording the radiation images of the object on the two stimulable phosphor sheets and the operation for reading out the radiation image having been recorded previously on a stimulable phosphor sheet are performed simultaneously, the time required to perform the entire processing can be kept short, and the intervals between successive image recording operations can be kept small.

Furthermore, with the energy subtraction processing method and apparatus in accordance with the present invention, the addition ratio of the front surface side image signal in the addition process, which is performed on the front surface side image signal and the back surface side image signal having been detected from the first stimulable phosphor sheet, may be set at a value higher than the addition ratio of the front surface side image signal in the addition process, which is performed on the front surface side image signal and the back surface side image signal having been detected from the second stimulable phosphor sheet, and the first image signal and the second image signal may thereby be obtained. As will be described later, the ratio of the intensity of the light, which is emitted from the front surface of the first stimulable phosphor sheet, to the intensity of the light, which is emitted from the back surface of the first stimulable phosphor sheet, is higher than the ratio of the intensity of the light, which is emitted from the front surface of the second stimulable phosphor sheet, to the intensity of the light, which is emitted from the back surface of the second stimulable phosphor sheet. Therefore, with the energy subtraction processing method and apparatus in accordance with the present invention, wherein the addition ratios are set in the manner described above, the first image signal and the second image signal, which have signal-to-noise ratios enhanced even further, can be obtained.

DESCRIPTION OF THE PREFERRED EMBODIMENTS

The present invention will hereinbelow be described in further detail with reference to the accompanying drawings.

Figure 1:
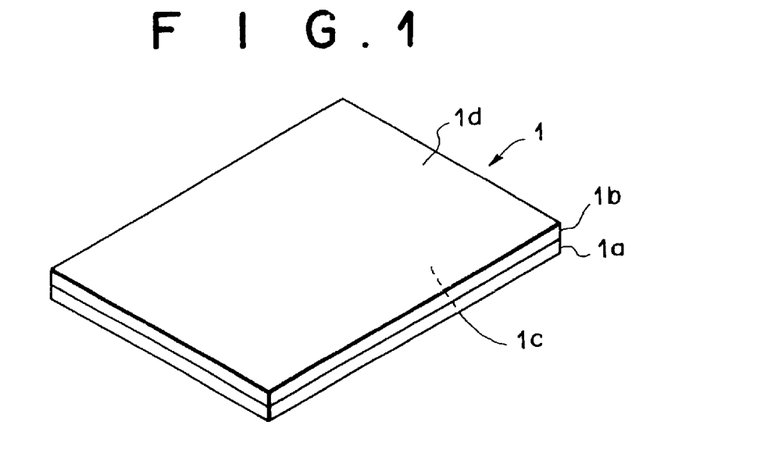
FIG. 1 is a perspective view showing an example of a stimulable phosphor sheet employed in the energy subtraction processing method and apparatus in accordance with the present invention.

FIG. 1 is a perspective view showing an example of a stimulable phosphor sheet employed in the energy subtraction processing method and apparatus in accordance with the present invention. With reference to FIG. 1, a stimulable phosphor sheet 1 comprises a sheet-shaped substrate 1a and a stimulable phosphor layer (e.g., a BaFBrI:Eu layer) 1b overlaid on a front surface side of the substrate 1a. The surface of the stimulable phosphor sheet 1 on the side of the substrate 1a is taken as a back surface 1c of the stimulable phosphor sheet 1. The surface of the stimulable phosphor sheet 1 on the side of the stimulable phosphor layer 1b is taken as a front surface 1d of the stimulable phosphor sheet 1. As the substrate 1a, for example, thin, flexible plastic film having a thickness falling within the range of 100 $\mu$m to 500 $\mu$m may be utilized. However, one of various other kinds of substrates may also be utilized as the substrate 1a. Though not shown, a transparent protective layer having a thickness falling within the range of 2 $\mu$m to 50 $\mu$m is overlaid on the front surface side of the stimulable phosphor layer 1b.

The stimulable phosphor sheet 1 may be constituted as a stimulable phosphor sheet, which allows detection of an image signal from its one surface alone. Alternatively, the stimulable phosphor sheet 1 may be constituted as a stimulable phosphor sheet, which allows detection of two image signals from its opposite surfaces. In cases where the stimulable phosphor sheet 1 is constituted as the stimulable phosphor sheet, which allows detection of an image signal from its one surface alone, for example, the substrate 1a is formed from a material, which is not transparent and does not transmit the light emitted by the stimulable phosphor sheet 1 when the stimulable phosphor sheet 1 is exposed to stimulating rays. Therefore, in such cases, the light emitted by the stimulable phosphor sheet 1 emanates only from the side of the stimulable phosphor layer 1b, i.e. from the front surface 1d. In cases where the stimulable phosphor sheet 1 is constituted as the stimulable phosphor sheet, which allows detection of two image signals from its opposite surfaces, for example, the substrate 1a is formed from a material, which is transparent and transmits the light emitted by the stimulable phosphor sheet 1 when the stimulable phosphor sheet 1 is exposed to stimulating rays. Therefore, in such cases, the light emitted by the stimulable phosphor sheet 1 emanates from the side of the stimulable phosphor layer 1b, i.e. from the front surface 1d, and from the side of the substrate 1a, i.e. from the back surface 1c. In cases where the stimulable phosphor sheet 1 is constituted as the stimulable phosphor sheet, which allows detection of two image signals from its opposite surfaces, the substrate 1a may be constituted of a transparent, flexible substrate, such as transparent plastic film having a thickness falling within the range of 100 $\mu$m to 500 $\mu$m. Alternatively, the substrate 1a may be formed from a rigid material, such as glass.

An example of a radiation image recording and read-out apparatus, in which an embodiment of the energy subtraction processing apparatus in accordance with the present invention is employed, will be described hereinbelow with reference to FIG. 2.

Figure 2:
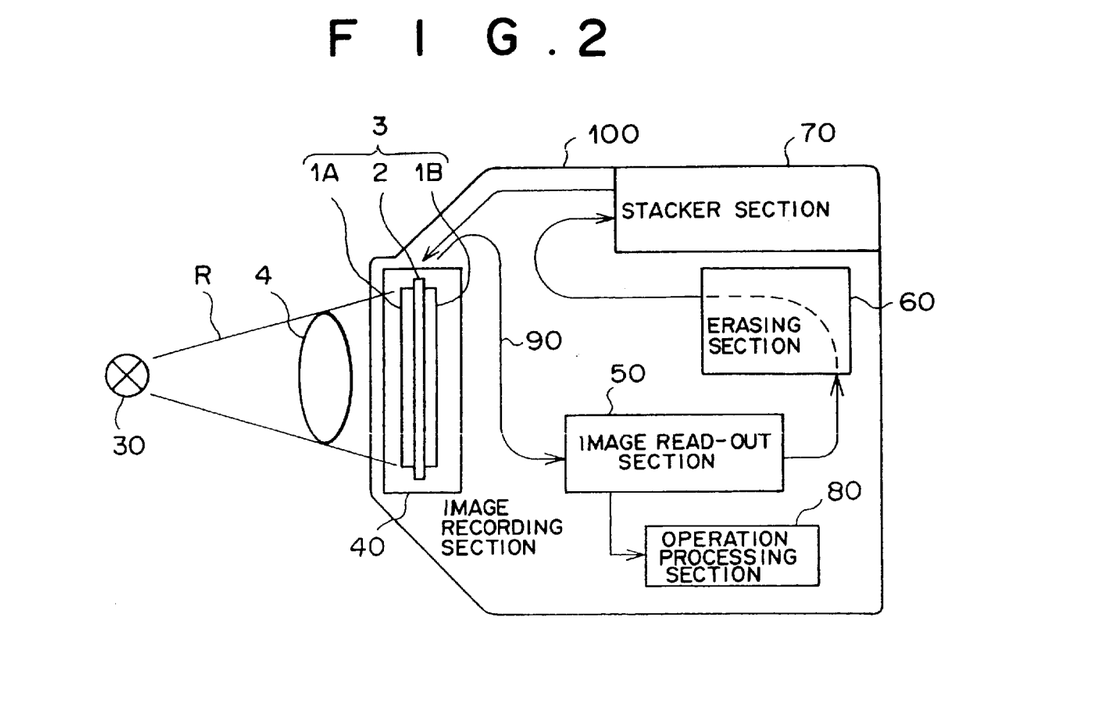
FIG. 2 is a schematic view showing an example of a radiation image recording and read-out apparatus, in which an embodiment of the energy subtraction processing apparatus in accordance with the present invention is employed.

As illustrated in FIG. 2, the radiation image recording and read-out apparatus comprises a radiation source 30, an image recording section 40, an image read-out section 50, an erasing section 60, a stacker section 70, an operation processing section 80, and a conveyance path 90. The image recording section 40, the image read-out section 50, the erasing section 60, the stacker section 70, the operation processing section 80, and the conveyance path 90 are accommodated in a single case housing 100. The stimulable phosphor sheet 1 is conveyed through the conveyance path 90 and circulated through the respective sections 40 to 70. The radiation image recording and read-out apparatus is thus constituted as a built-in type of apparatus. The radiation image recording and read-out apparatus accommodates two stimulable phosphor sheets and may perform an image recording operation and an image read-out operation. Alternatively, the radiation image recording and read-out apparatus may accommodate three or more stimulable phosphor sheets and may perform the image recording operation and the image read-out operation.

In the image recording section 40, two stimulable phosphor sheets are superposed one upon the other with an energy separation filter intervening therebetween and are simultaneously exposed to radiation carrying image information of an object, and the image information of the object is thereby stored on the two stimulable phosphor sheets. Specifically, two stimulable phosphor sheets 1A and 1B, each of which allows detection of two image signals from its opposite surfaces, are conveyed from the stacker section 70 into the image recording section 40. Each of the stimulable phosphor sheets 1A and 1B is flexible and comprises a transparent film substrate and a stimulable phosphor layer overlaid upon the front surface side of the substrate. In the image recording section 40, the stimulable phosphor sheets 1A and 1B are superposed one upon the other with a copper plate 2, which acts as an energy separation filter for absorbing low energy components of radiation, intervening therebetween. In this manner, a composite 3 is formed. Thereafter, radiation R is produced by the radiation source 30 and irradiated to an object (in this embodiment, the chest of a human body) 4. The radiation R carrying the image information of the object 4 impinges upon the composite 3.

The radiation R carrying the image information of the object 4 firstly impinges upon the first stimulable phosphor sheet 1A, which is located on the side close to the radiation source 30. As a result, of the energy from the radiation R, the energy from the radiation, which contains the low energy components in a comparatively high proportion, is stored on the first stimulable phosphor sheet 1A. In this manner, a radiation image of the object 4 is stored on the first stimulable phosphor sheet 1A. The radiation R, which has passed through the first stimulable phosphor sheet 1A, then passes through the copper plate 2 acting as the filter for filtering out the low energy components of the radiation. The radiation, which has passed through the copper plate 2 and now contains high energy components in a comparatively high proportion, impinges upon the second stimulable phosphor sheet 1B. In this manner, a radiation image of the object 4 is stored on the second stimulable phosphor sheet 1B. After the radiation images of the object 4 have been stored on the first stimulable phosphor sheet 1A and the second stimulable phosphor sheet 1B in the image recording section 40, the first stimulable phosphor sheet 1A and the second stimulable phosphor sheet 1B are conveyed through the conveyance path 90 into the image read-out section 50.

In the image read-out section 50, as for the first stimulable phosphor sheet 1A, only the light emitted from the front surface of the first stimulable phosphor sheet 1A is detected, and a first image signal S1 is thereby obtained. As for the second stimulable phosphor sheet 1B, the light emitted from the front surface of the second stimulable phosphor sheet 1B is detected in order to obtain a front surface side image signal Q1, and the light emitted from the back surface of the second stimulable phosphor sheet 1B is detected in order to obtain a back surface side image signal Q2. Also, a weighted addition process is performed on the front surface side image signal Q1 and the back surface side image signal Q2, and a second image signal S2 is thereby obtained. An example of the image read-out section 50 will be described hereinbelow with reference to FIG. 3. The first stimulable phosphor sheet 1A may be subjected firstly to the image read-out operation, or the second stimulable phosphor sheet 1B may be subjected firstly to the image read-out operation. As an aid in facilitating the explanation, how the image read-out operation is performed on the second stimulable phosphor sheet 1B will firstly be described hereinbelow.

Figure 3:
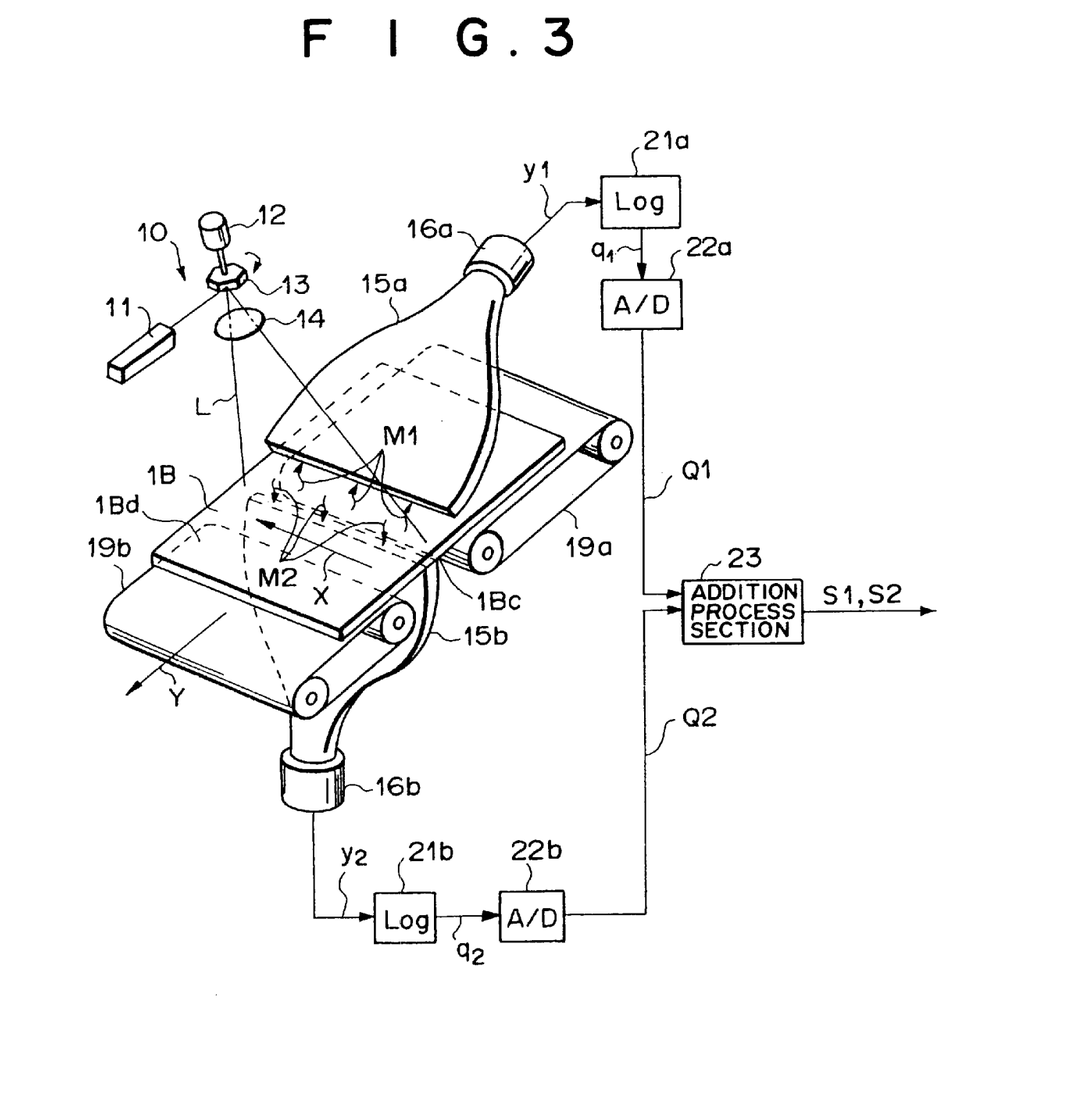
FIG. 3 is a perspective view showing an image read-out section in the radiation image recording and read-out apparatus of FIG. 2.

The image read-out section 50 is constituted such that the radiation image information having been stored on the stimulable phosphor sheet 1 can be read out from both the front surface 1d and the back surface 1c of the stimulable phosphor sheet 1. In the image read-out section 50, as illustrated in FIG. 3, the second stimulable phosphor sheet 1B, on which the radiation image information has been stored, is set at a predetermined position on an endless belt 19a such that a front surface 1Bd of the second stimulable phosphor sheet 1B stands facing up. The second stimulable phosphor sheet 1B is conveyed in the direction (sub-scanning direction), which is indicated by the arrow Y, by endless belts 19a and 19b, which are driven by motors (not shown).

A laser beam L, which serves as stimulating rays, is produced by a laser beam source 11. The laser beam L is reflected and deflected by a rotating polygon mirror 13, which is being quickly rotated by a motor 12 in the direction indicated by the arrow. The laser beam L is then converged by a scanning lens 14 onto the front surface 1Bd of the second stimulable phosphor sheet 1B and is caused to scan the front surface 1Bd at uniform speed. The front surface 1Bd of the second stimulable phosphor sheet 1B is thus scanned with the laser beam L in the main scanning direction indicated by the arrow X. By the main scanning with the laser beam L and the sub-scanning of the second stimulable phosphor sheet 1B, the entire area of the second stimulable phosphor sheet 1B is exposed to the laser beam L.

The laser beam L impinging upon the second stimulable phosphor sheet 1B causes a stimulable phosphor layer 1Bb of the second stimulable phosphor sheet 1B to emit light in proportion to the amount of energy stored thereon during its exposure to the radiation R. Light M1 in accordance with the stored radiation image information is emitted from the front surface 1Bd of the second stimulable phosphor sheet 1B. Also, Light M2 in accordance with the stored radiation image information is emitted from a back surface 1Bc of the second stimulable phosphor sheet 1B.

The light M1, which has been emitted from the front surface 1Bd of the second stimulable phosphor sheet 1B, is guided by a light guide member 15a, which is located close to the front surface 1Bd, into a photomultiplier 16a and is photoelectrically detected by the photomultiplier 16a. Also, the light M2, which has been emitted from the back surface 1Bc of the second stimulable phosphor sheet 1B, is guided by a light guide member 15b, which is located close to the back surface 1Bc, into a photomultiplier 16b and is photoelectrically detected by the photomultiplier 16b. Each of the light guide member 15a and the light guide member 15b is made from a light guiding material, such as an acrylic plate. Each of the light guide member 15a and the light guide member 15b has a linear light input face, which is positioned to extend along the main scanning line on the second stimulable phosphor sheet 1B, and a ring-shaped light output face, which is positioned so that it is in close contact with a light receiving face of the corresponding photomultiplier 16a or 16b. The emitted light M1, which has entered the light guide member 15a from its light input face, is guided through repeated total reflection inside of the light guide member 15a, emanates from the light output face, and is received by the photomultiplier 16a. In this manner, the amount of the emitted light M1, which amount represents the stored radiation image information, is converted into an analog image signal y1 by the photomultiplier 16a. In the same manner as that described above, the emitted light M2, which has entered the light guide member 15b from its light input face, is guided through repeated total reflection inside of the light guide member 15b, emanates from the light output face, and is received by the photomultiplier 16b. In this manner, the amount of the emitted light M2, which amount represents the stored radiation image information, is converted into an analog image signal y2 by the photomultiplier 16b.

The analog image signal y1 generated by the photomultiplier 16a is logarithmically amplified by a logarithmic amplifier 21a and is converted into a logarithmic image signal q1. The logarithmic image signal q1 having been obtained from the logarithmic amplification is fed into an analog-to-digital conversion circuit 22a. The analog-to-digital converter 22a samples the logarithmic image signal q1 with a predetermined sampling period T, and the sampled signal is converted into a digital image signal Q1, i.e. the front surface side image signal Q1. In the same manner as that described above, the analog image signal y2 generated by the photomultiplier 16b is logarithmically amplified by a logarithmic amplifier 21b and is converted into a logarithmic image signal q2. The logarithmic image signal q2 having been obtained from the logarithmic amplification is fed into an analog-to-digital conversion circuit 22b. The analog-to-digital converter 22b samples the logarithmic image signal q2 with a predetermined sampling period T, and the sampled signal is converted into a digital image signal Q2, i.e. the back surface side image signal Q2. The front surface side image signal Q1 and the back surface side image signal Q2 are fed into an addition process section 23. In the addition process section 23, the image signal components of the front surface side image signal Q1 and the back surface side image signal Q2, which image signal components represent corresponding pixels on the front surface side and the back surface side of the second stimulable phosphor sheet 1B, are weighted and added to each other in a predetermined addition ratio. An image signal, which has been obtained from the weighted addition, is fed as the second image signal S2 into the operation processing section 80. The addition ratio of the front surface side image signal Q1 to the back surface side image signal Q2 is set appropriately such that noise may be suppressed.

How the image read-out operation is performed on the first stimulable phosphor sheet 1A will be described hereinbelow. As for the first stimulable phosphor sheet 1A, only the light emitted from a front surface 1Ad of the first stimulable phosphor sheet 1A is detected. For such purposes, in the same manner as that for the second stimulable phosphor sheet 1B, the first stimulable phosphor sheet 1A is scanned with the laser beam L. In such cases, for example, the photomultiplier 16b located on the back surface side is not operated, and only the image signal Q1 obtained from the photomultiplier 16a located on the front surface side is fed into the addition process section 23. Only the image signal Q1 obtained from the front surface side is fed as the first image signal S1 from the addition process section 23 into the operation processing section 80.

In the operation processing section 80, a predetermined subtraction process (an energy subtraction operation) is performed on the first image signal S1 and the second image signal S2, and an energy subtraction image signal is obtained. Specifically, in the operation processing section 80, when necessary, image processing or processing for matching the positions of the radiation images represented by the first image signal S1 and the second image signal S2 is performed on the first image signal S1, which has been obtained from the first stimulable phosphor sheet 1A with the technique for detecting an image signal from one surface of a stimulable phosphor sheet alone, and the second image signal S2, which has been obtained from the second stimulable phosphor sheet 1B with the technique for detecting two image signals from opposite surfaces of a stimulable phosphor sheet. Thereafter, a subtraction process is performed on the first image signal S1 an the second image signal S2. The subtraction process is performed in accordance with, for example, the formula shown below.

$$Sp = Ka \cdot S1 + Kb \cdot S2 + Kc$$

in which each of Ka and Kb is the parameter (the fixed number) for determining the weight of each of the first image signal S1 and the second image signal S2, and Kc is the parameter (the fixed number) for determining the bias component.

The first radiation image represented by the first image signal S1 (i.e., the radiation image having been stored on the first stimulable phosphor sheet 1A) is the image having been formed with the radiation having a comparatively low energy level. The second radiation image represented by the second image signal S2 (i.e., the radiation image having been stored on the second stimulable phosphor sheet 1B) is the image having been formed with the radiation having a comparatively high energy level. In both the first and second radiation images, a bone pattern and a soft tissue pattern are embedded (with different image densities). In cases where the subtraction process is performed on the first and second radiation images in accordance with the formula shown above, and the energy subtraction image signal Sp is thereby obtained, the energy subtraction image represented by the energy subtraction image signal Sp can be formed. More specifically, by the setting of the aforesaid parameters at appropriate values, a bone image, in which the soft tissue pattern has been erased and only the bone pattern is illustrated, or a soft tissue image, in which the bone pattern has been erased and only the soft tissue pattern is illustrated, can be obtained as the energy subtraction image.

Reverting to FIG. 2, the stimulable phosphor sheet 1, from which the image signal has been detected with the image read-out operation performed in the image read-out section 50, is conveyed from the image read-out section 50 through the conveyance path 90 into the erasing section 60. In the erasing section 60, the stimulable phosphor sheet 1 is exposed to erasing light, and radiation energy remaining on the stimulable phosphor sheet 1 is released from the stimulable phosphor sheet 1. Thereafter, the erased stimulable phosphor sheet 1 is conveyed into the stacker section 70. The stimulable phosphor sheet 1 is accommodated in the stacker section 70 till the next image recording operation is to be performed on the stimulable phosphor sheet 1. When the next image recording operation is to be performed on the stimulable phosphor sheet 1, the stimulable phosphor sheet 1 is again conveyed into the image recording section 40.

In this embodiment, specifically, as described above, each of the first stimulable phosphor sheet 1A and the second stimulable phosphor sheet 1B comprises the substrate constituted of the transparent film, which has a thickness falling within the range of 100 $\mu$m to 500 $\mu$m, and the stimulable phosphor layer overlaid on the substrate. Also, in each of the first stimulable phosphor sheet 1A and the second stimulable phosphor sheet 1B, the stimulable phosphor layer has a thickness of approximately 300 $\mu$m. The radiation source 30 has a tube voltage of 100 kV. The copper plate 2 having a thickness of 1 mm is located as the energy separation filter between the first stimulable phosphor sheet 1A and the second stimulable phosphor sheet 1B.

As described above, in this embodiment, as each of the first stimulable phosphor sheet 1A and the second stimulable phosphor sheet 1B, the stimulable phosphor sheet, which allows detection of two image signals from its opposite surfaces, is employed. In such cases, only the single kind of the stimulable phosphor sheets may be processed. Therefore, for example, in the built-in type of the radiation image recording and read-out apparatus described above, it is not necessary to discriminate and process two kinds of stimulable phosphor sheets. Accordingly, the processing and management of stimulable phosphor sheets can be kept easy.

In the embodiment described above, the stimulable phosphor sheet, which allows detection of two image signals from its opposite surfaces, is employed as the first stimulable phosphor sheet 1A, and the light emitted from the front surface side of the first stimulable phosphor sheet 1A is detected in order to obtain the first image signal S1. Alternatively, as for the first stimulable phosphor sheet 1A, as in the cases of the second stimulable phosphor sheet 1B, a front surface side image signal and a back surface side image signal may be detected from the opposite surfaces of the first stimulable phosphor sheet 1A. Also, the front surface side image signal and the back surface side image signal having thus been obtained may be weighted appropriately and added to each other, and the first image signal may thereby be obtained.

In the energy subtraction processing method and apparatus in accordance with the present invention, both the first stimulable phosphor sheet 1A and the second stimulable phosphor sheet 1B need not necessarily be constituted of the stimulable phosphor sheets, each of which allows detection of two image signals from its opposite surfaces. Specifically, the first stimulable phosphor sheet 1A may be constituted of a stimulable phosphor sheet, which allows detection of an image signal from its one surface alone, and the second stimulable phosphor sheet 1B may be constituted of the stimulable phosphor sheet, which allows detection of two image signals from its opposite surfaces. In such cases, for example, as the first stimulable phosphor sheet 1A, which allows detection of an image signal from its one surface alone, a stimulable phosphor sheet comprising a substrate constituted of a non-transparent film, which has a thickness falling within the range of 100 $\mu$m to 500 $\mu$m, and a stimulable phosphor layer having a thickness of approximately 200 $\mu$m, which is overlaid on the substrate, may be employed. Also, as the second stimulable phosphor sheet 1B, which allows detection of two image signals from its opposite surfaces, a stimulable phosphor sheet comprising a substrate constituted of a transparent film, which has a thickness falling within the range of 100 $\mu$m to 500 $\mu$m, and a stimulable phosphor layer having a thickness of approximately 400 $\mu$m, which is overlaid on the substrate, may be employed. In the image recording operation, the copper plate 2 having a thickness of 1 mm may be located as the energy separation filter between the first stimulable phosphor sheet 1A and the second stimulable phosphor sheet 1B, and the thus formed composite 3 may be exposed to the radiation produced by the radiation source 30 having a tube voltage of 100 $\mu$kV. Thereafter, in the image read-out operation, as for the first stimulable phosphor sheet 1A, only the light emitted from the front surface of the first stimulable phosphor sheet 1A may be detected in order to obtain the first image signal S1. As for the second stimulable phosphor sheet 1B, the light emitted from the opposite surfaces of the second stimulable phosphor sheet 1B may be detected in order to obtain the front surface side image signal Q1 and the back surface side image signal Q2. The front surface side image signal Q1 and the back surface side image signal Q2 may then be weighted and added to each other in order to obtain the second image signal S2.

Also, in the embodiment described above, the thickness of the stimulable phosphor layer of the second stimulable phosphor sheet 1B is larger than the thickness of the stimulable phosphor layer of the first stimulable phosphor sheet 1A. In such cases, the thickness of the stimulable phosphor layer of the first stimulable phosphor sheet 1A located on the side close to the radiation source 30 becomes comparatively small, and the dose of radiation after having passed through the stimulable phosphor layer of the first stimulable phosphor sheet 1A becomes large. Also, since the thickness of the stimulable phosphor layer of the second stimulable phosphor sheet 1B located on the side remote from the radiation source 30 becomes comparatively large, the stimulable phosphor layer of the second stimulable phosphor sheet 1B can efficiently absorb the incident radiation. Accordingly, the second stimulable phosphor sheet 1B can absorb more of the radiation, and the second image signal S2 having a signal-to-noise ratio enhanced even further can be obtained.

A different example of a radiation image recording and read-out apparatus, in which a different embodiment of the energy subtraction processing apparatus in accordance with the present invention is employed, will be described hereinbelow with reference to FIG. 4. In the radiation image recording and read-out apparatus, three stimulable phosphor sheets having equivalent performance, each of which allows detection of two image signals from its opposite surfaces, are accommodated. Also, the operation for recording the radiation images of the object by utilizing two stimulable phosphor sheets, which are among the three stimulable phosphor sheets, and the operation for reading out a radiation image from a stimulable phosphor sheet, which is among the three stimulable phosphor sheets and on which a radiation image of an object has been recorded previously, are performed simultaneously with each other.

Figure 4:
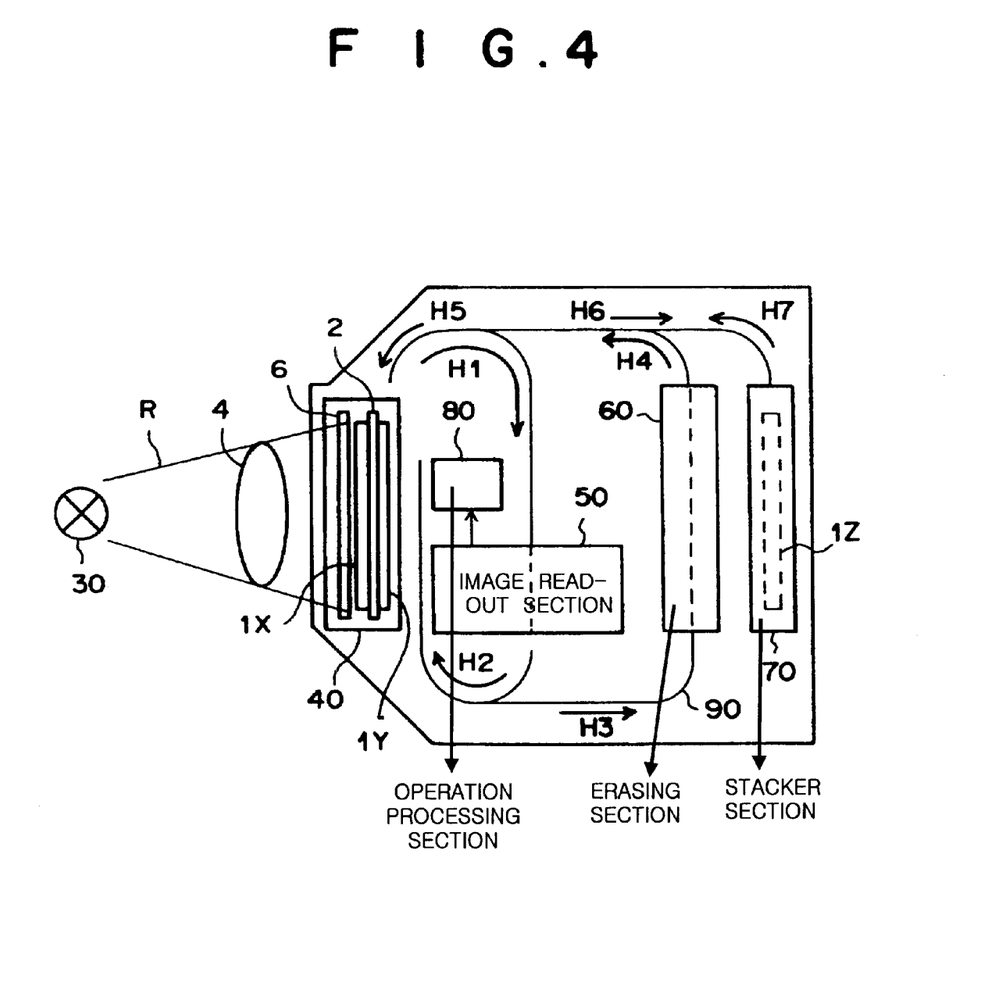
FIG. 4 is a schematic view showing a different example of a radiation image recording and read-out apparatus, in which a different embodiment of the energy subtraction processing apparatus in accordance with the present invention is employed.

With reference to FIG. 4, as in the radiation image recording and read-out apparatus of FIG. 2, the radiation image recording and read-out apparatus comprises the radiation source 30, the image recording section 40, the image read-out section 50, the erasing section 60, the stacker section 70, the operation processing section 80, and the conveyance path 90. The image recording section 40, the image read-out section 50, the erasing section 60, the stacker section 70, the operation processing section 80, and the conveyance path 90 are accommodated in the single case housing 100. The stimulable phosphor sheet 1 is conveyed through the conveyance path 90 and circulated through the respective sections 40 to 70. The radiation image recording and read-out apparatus is thus constituted as a built-in type of apparatus. Basically, the constitutions and effects of the stimulable phosphor sheet 1, which allows detection of two image signals from its opposite surfaces, the radiation source 30, the image recording section 40, the image read-out section 50, the erasing section 60, the stacker section 70, the operation processing section 80, and the conveyance path 90 in the radiation image recording and read-out apparatus of FIG. 4 are the same as those in the radiation image recording and read-out apparatus of FIG. 2.

How the successive image recording operations utilizing the three stimulable phosphor sheets 1 (1X, 1Y, and 1Z) are performed will be described hereinbelow. Firstly, at the image recording section 40, two stimulable phosphor sheets 1X and 1Y, each of which allows detection of two image signals from its opposite surfaces, are superposed one upon the other with the energy separation filter 2, which is constituted of a copper plate, intervening therebetween. Also, at this time, one stimulable phosphor sheet 1Z, which allows detection of two image signals from its opposite surfaces, is accommodated in the stacker section 70. In the image recording section 40, a scattered radiation removing grid 6 is located in front of the sheet 1X, which is located on the side close to the object 4. In this state, the radiation R is irradiated to the object 4, and the radiation carrying image information of the object 4 is caused to impinge upon the stimulable phosphor sheets 1X and 1Y at the same time. In this manner, radiation images of the object 4 are recorded respectively on the stimulable phosphor sheets 1X and 1Y. The operation for recording the radiation images is performed in the same manner as that in the radiation image recording and read-out apparatus of FIG. 2.

After the image recording operation is finished, either one of the stimulable phosphor sheets 1X and 1Y is taken out of the image recording section 40. For example, in this case, the stimulable phosphor sheet 1X, which is located on the side close to the object 4, is firstly taken out of the image recording section 40. The stimulable phosphor sheet 1X is conveyed in the direction indicated by the arrow H1 along the conveyance path 90 into the image read-out section 50. In the image read-out section 50, the operation for detecting two image signals from the opposite surfaces of the stimulable phosphor sheet is performed on the stimulable phosphor sheet 1X, and the front surface side image signal Q1 and the back surface side image signal Q2 are thereby obtained from the stimulable phosphor sheet 1X. The front surface side image signal Q1 and the back surface side image signal Q2 are then added to each other in appropriate addition ratios, and the first image signal S1 is thereby obtained from the stimulable phosphor sheet 1X. The operation for detecting two image signals from the opposite surfaces of the stimulable phosphor sheet is performed in the same manner as that in the radiation image recording and read-out apparatus of FIG. 2. As the image read-out operation proceeds, the stimulable phosphor sheet 1X is conveyed in the direction indicated by the arrow H2 along the conveyance path 90.

After the image read-out operation for the stimulable phosphor sheet 1X has been finished in the manner described above, the direction of conveyance of the stimulable phosphor sheet 1X is changed from the direction indicated by the arrow H2 to the direction indicated by the arrow H3, and the stimulable phosphor sheet 1X is conveyed into the erasing section 60. While the stimulable phosphor sheet 1X is passing through the erasing section 60, the erasing light is irradiated to the opposite surfaces of the stimulable phosphor sheet 1X, and radiation energy remaining on the stimulable phosphor sheet 1X after the image read-out operation is erased. The erasing is performed in the same manner as that in the radiation image recording and read-out apparatus of FIG. 2. When the image read-out operation for the stimulable phosphor sheet 1X has been finished and the stimulable phosphor sheet 1X has been conveyed into the erasing section 60, the stimulable phosphor sheet 1Y is taken out of the image recording section 40 and conveyed into the image read-out section 50. In the image read-out section 50, the operation for detecting two image signals from the opposite surfaces of the stimulable phosphor sheet is performed on the stimulable phosphor sheet 1Y, and the front surface side image signal Q1 and the back surface side image signal Q2 are thereby obtained from the stimulable phosphor sheet 1Y. The front surface side image signal Q1 and the back surface side image signal Q2 are then added to each other in appropriate addition ratios, and the second image signal S2 is thereby obtained from the stimulable phosphor sheet 1Y.

When the stimulable phosphor sheet 1Y has been conveyed into the image read-out section 50 in the manner described above, the stimulable phosphor sheet 1Z, which has been accommodated in the stacker section 70, is taken out of the stacker section 70 and conveyed in the directions indicated by the arrows H7 and H5 along the conveyance path 90 into the image recording section 40. In the image recording section 40, the stimulable phosphor sheet 1Z is located in front of the energy separation filter 2. Also, the stimulable phosphor sheet 1X, which has been erased in the manner described above, is conveyed in the directions indicated by the arrows H4 and H5 into the image recording section 40. In the image recording section 40, the erased stimulable phosphor sheet 1X is located at the rear of the energy separation filter 2. The stimulable phosphor sheets 1Z and 1X are thus superposed one upon the other with the energy separation filter 2 intervening therebetween, such that a next image recording operation can be performed on the stimulable phosphor sheets 1Z and 1X. At this time, the image read-out operation for the stimulable phosphor sheet 1Y has not yet been finished. Therefore, the next image recording operation utilizing the stimulable phosphor sheets 1Z and 1X can be performed simultaneously with the image read-out operation for the stimulable phosphor sheet 1Y. Specifically, the next image recording operation can be performed while the image read-out operation for the stimulable phosphor sheet 1Y is being performed.

After the next image recording operation has been performed simultaneously with the image read-out operation for the stimulable phosphor sheet 1Y and the image read-out operation for the stimulable phosphor sheet 1Y has been finished, the stimulable phosphor sheet 1Y is conveyed into the erasing section 60 and erased. Thereafter, the stimulable phosphor sheet 1Y is conveyed in the direction indicated by the arrow H4, and the direction of conveyance of the stimulable phosphor sheet 1Y is then changed from the direction indicated by the arrow H4 to the direction indicated by the arrow H6. In this manner, the stimulable phosphor sheet 1Y is accommodated in the stacker section 70. Also, after the stimulable phosphor sheet 1Y has been conveyed out of the image read-out section 50, the same operations as those described above are iterated, and the image recording operation and the image read-out operation are performed simultaneously. In this manner, the image recording operations are performed successively.

In the manner described above, the three stimulable phosphor sheets are utilized, and the image read-out operation for one stimulable phosphor sheet and the image recording operation for two stimulable phosphor sheets are performed simultaneously. In such cases, the time required to perform the entire processing can be kept short, and the intervals between successive image recording operations can be kept short. The system for simultaneously performing the image recording operation for two stimulable phosphor sheets and the image read-out operation for one stimulable phosphor sheet can also be accomplished in cases where four or more stimulable phosphor sheets having equivalent performance, each of which allows detection of two image signals from its opposite surfaces, are accommodated in the radiation image recording and read-out apparatus of FIG. 4, and the stacker section 70 is constituted so as to be capable of accommodating two or more stimulable phosphor sheets.

Figure 5:
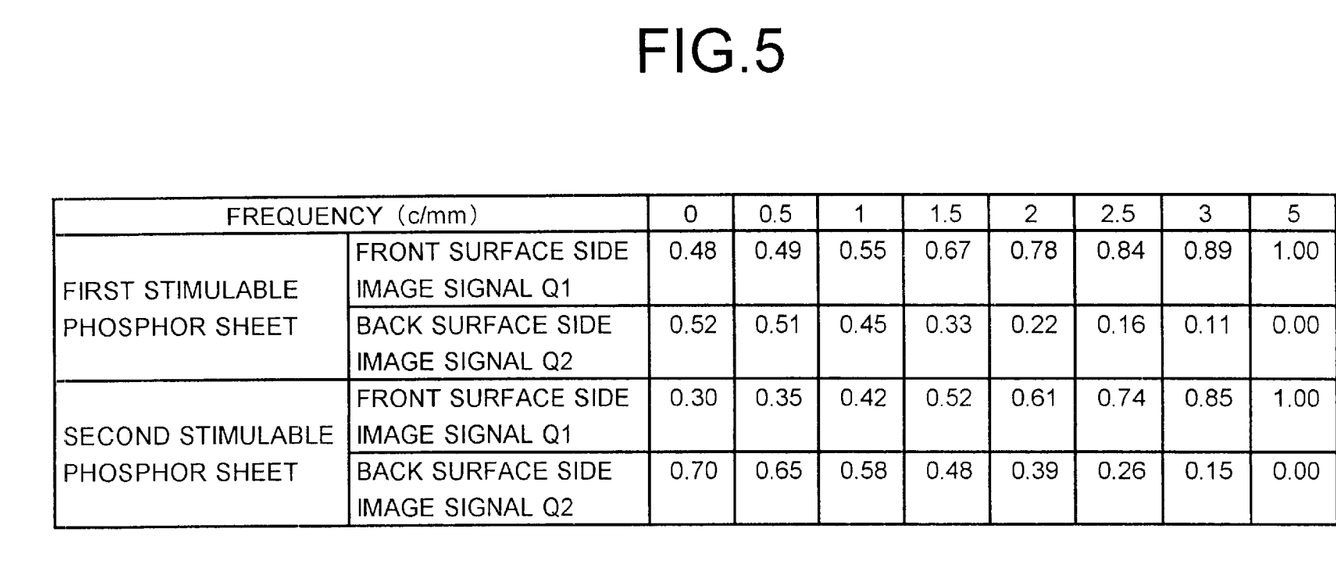
FIG. 5 is a diagram showing examples of addition ratios of front surface side image signals to back surface side image signals.

In cases where the operation for detecting two image signals from opposite surfaces of a stimulable phosphor sheet is performed on each of the two stimulable phosphor sheets, on which the radiation images of a single object have respectively been recorded, the addition ratios may be set in the manner described below. In the radiation image recording and read-out apparatus of FIG. 4, in each of the cases of the first stimulable phosphor sheet located on the side close to the object 4 and the second stimulable phosphor sheet located on the side remote from the object 4, signal components of the front surface side image signal Q1 and the back surface side image signal Q2, which signal components are of an identical frequency, are added to each other in appropriate addition ratios. FIG. 5 shows examples of the addition ratios.

The addition ratios shown in FIG. 5 are those in cases where the tube voltage of the radiation source 30 is 120 kV and a copper plate of 0.8 mm is employed as the energy separation filter 2. The addition ratios are the factors by which the front surface side image signal Q1 and the back surface side image signal Q2 are multiplied. For example, in the cases of the signal components of a frequency of 0 c/mm with respect to the first stimulable phosphor sheet, the product, which is obtained by multiplying the signal component of the frequency of 0 c/mm of the front surface side image signal Q1 by an addition ratio of 0.48, and the product, which is obtained by multiplying the signal component of the frequency of 0 c/mm of the back surface side image signal Q2 by an addition ratio of 0.52, are added to each other. The thus obtained value is taken as the value of the signal component of the frequency of 0 c/mm of the first image signal S1. The addition ratios are set such that, with respect to each frequency component, the sum of the addition ratio of the front surface side image signal and the addition ratio of the back surface side image signal becomes equal to 1.

The radiation absorbed by the first stimulable phosphor sheet has the energy distribution with more of low energy components. Therefore, more of the radiation is absorbed by the stimulable phosphor layer of the first stimulable phosphor sheet, and the difference between the intensity of the light emitted from the front surface of the first stimulable phosphor sheet and the intensity of the light emitted from the back surface of the first stimulable phosphor sheet is large. As for the second stimulable phosphor sheet, the radiation having passed through the energy separation filter, such as a copper plate, impinges upon the second stimulable phosphor sheet. Therefore, less of the radiation is absorbed by the stimulable phosphor layer of the second stimulable phosphor sheet, and the difference between the intensity of the light emitted from the front surface of the second stimulable phosphor sheet and the intensity of the light emitted from the back surface of the second stimulable phosphor sheet is small. Accordingly, as shown in FIG. 5, as for each frequency component, the addition ratio of the front surface side image signal with respect to the first stimulable phosphor sheet should preferably be set to be higher than the addition ratio of the front surface side image signal with respect to the second stimulable phosphor sheet. As a result, the first image signal and the second image signal having high signal-to-noise ratios can be obtained. It is also possible to perform the addition process regardless of the frequency components. In such cases, for example, the addition ratios listed for the frequency of 1 c/mm in FIG. 5 may be employed.

The energy subtraction processing method and apparatus in accordance with the present invention is not limited to the embodiment, wherein the two stimulable phosphor sheets are utilized and the subtraction process is performed on the two radiation images having been stored on the two stimulable phosphor sheets. Specifically, at least three radiation images may be formed on at least three stimulable phosphor sheets and with several kinds of radiation having different energy distributions. A subtraction process may then be performed on image signals, which have been detected from the at least three stimulable phosphor sheets, and an energy subtraction image signal representing an energy subtraction image may thereby be obtained. In such cases, it is sufficient for the stimulable phosphor sheets to be substantially provided with sheet-shaped stimulable phosphor layers, and no limitation is imposed on specific constitution of the stimulable phosphor sheets.

The energy separation filter may be formed from one of various materials, which can absorb the low energy components of radiation. Also, the energy separation filter may be utilized in one of various forms. For example, the substrate of the first stimulable phosphor sheet 1A located close to the radiation source 30 may be formed from a material capable of absorbing the energy separation filter of radiation and may thus act as the energy separation filter.

What is claimed is:

1. An energy subtraction processing method, wherein at least two stimulable phosphor sheets are superposed one upon the other with an energy separation filter, which absorbs low energy components of radiation, intervening therebetween and are then exposed simultaneously to radiation carrying image information of an object, which is composed of a plurality of structures having different radiation energy absorption characteristics, radiation images of the object are thus stored respectively on the stimulable phosphor sheets, and a subtraction process is performed on a first image signal, which has been detected by reading out a first radiation image having been stored on a first stimulable phosphor sheet located on the side close to the object, and a second image signal, which has been detected by reading out a second radiation image having been stored on a second stimulable phosphor sheet located on the side remote from the object, an energy subtraction image signal being thereby obtained, the method comprising the steps of:

i) utilizing a stimulable phosphor sheet, which allows detection of two image signals from its opposite surfaces, as the second stimulable phosphor sheet, ii) performing an addition process on a front surface side image signal, which has been detected by reading out the second radiation image from a front surface of the second stimulable phosphor sheet, and a back surface side image signal, which has been detected by reading out the second radiation image from a back surface of the second stimulable phosphor sheet, in order to obtain the second image signal, and iii) performing the subtraction process on the first image signal and the thus obtained second image signal.

2. A method as defined in claim 1 wherein the first stimulable phosphor sheet is a stimulable phosphor sheet, which allows detection of an image signal from its one surface alone, and the first image signal is an image signal having been detected by reading out the first radiation image from the first stimulable phosphor sheet, which allows detection of an image signal from its one surface alone.

3. A method as defined in claim 1 wherein the first stimulable phosphor sheet is a stimulable phosphor sheet, which allows detection of two image signals from its opposite surfaces, and the first image signal is an image signal having been detected by reading out the first radiation image from the front surface of the stimulable phosphor sheet, which allows detection of two image signals from its opposite surfaces.

4. A method as defined in claim 1 wherein the first stimulable phosphor sheet is a stimulable phosphor sheet, which allows detection of two image signals from its opposite surfaces, and the first image signal is an image signal obtained from an addition process performed on a front surface side image signal having been detected by reading out the first radiation image from a front surface of the first stimulable phosphor sheet, which allows detection of two image signals from its opposite surfaces, and a back surface side image signal having been detected by reading out the first radiation image from a back surface of the first stimulable phosphor sheet, which allows detection of two image signals from its opposite surfaces.

5. A method as defined in claim 1, 2, 3, or 4 wherein a thickness of a stimulable phosphor layer of the second stimulable phosphor sheet may be larger than the thickness of the stimulable phosphor layer of the first stimulable phosphor sheet.

6. A method as defined in claim 4 wherein at least three stimulable phosphor sheets, each of which allows detection of two image signals from its opposite surfaces, are utilized, an operation for recording the radiation images of the object is performed by utilizing two stimulable phosphor sheets, which are among the at least three stimulable phosphor sheets, and an operation for reading out a radiation image from a stimulable phosphor sheet, which is among the at least three stimulable phosphor sheets and on which a radiation image of an object has been recorded previously, is performed simultaneously with said operation for recording the radiation images of the object by utilizing the two stimulable phosphor sheets, which are among the at least three stimulable phosphor sheets.

7. A method as defined in claim 4 or 6 wherein an addition ratio of the front surface side image signal in the addition process, which is performed on the front surface side image signal and the back surface side image signal having been detected from the first stimulable phosphor sheet, is higher than an addition ratio of the front surface side image signal in the addition process, which is performed on the front surface side image signal and the back surface side image signal having been detected from the second stimulable phosphor sheet, and the first image signal and the second image signal are thereby obtained.

8. An energy subtraction processing apparatus, comprising:

i) an image recording section for simultaneously exposing at least two stimulable phosphor sheets to radiation carrying image information of an object in order to record radiation images of the object respectively on the stimulable phosphor sheets, the image recording section being constituted such that a first stimulable phosphor sheet is located on the side close to the object, a second stimulable phosphor sheet, which allows detection of two image signals from its opposite surfaces, is located on the side remote from the object, and an energy separation filter, which absorbs low energy components of radiation, intervenes between the first stimulable phosphor sheet and the second stimulable phosphor sheet, and such that the first stimulable phosphor sheet, the second stimulable phosphor sheet, and the energy separation filter intervening therebetween are superposed one upon another, ii) an image read-out section for reading out a first radiation image from the first stimulable phosphor sheet in order to obtain a first image signal, reading out a second radiation image from a front surface and a back surface of the second stimulable phosphor sheet in order to obtain a front surface side image signal and a back surface side image signal, and performing an addition process on the front surface side image signal and the back surface side image signal in order to obtain a second image signal, and iii) an operation processing section for performing a subtraction process on the first image signal and the second image signal in order to obtain an energy subtraction image signal.

9. An apparatus as defined in claim 8 wherein each of the at least two stimulable phosphor sheets is a stimulable phosphor sheet, which allows detection of two image signals from its opposite surfaces, and the image read-out section performs:

a) an operation for reading out the first radiation image from a front surface and a back surface of the first stimulable phosphor sheet in order to obtain a front surface side image signal and a back surface side image signal, and performing an addition process on the front surface side image signal and the back surface side image signal in order to obtain the first image signal, and b) an operation for reading out the second radiation image from the front surface and the back surface of the second stimulable phosphor sheet in order to obtain the front surface side image signal and the back surface side image signal, and performing the addition process on the front surface side image signal and the back surface side image signal in order to obtain the second image signal.

10. An apparatus as defined in claim 9 wherein at least three stimulable phosphor sheets, each of which allows detection of two image signals from its opposite surfaces, are utilized, an operation for recording the radiation images of the object is performed by utilizing two stimulable phosphor sheets, which are among the at least three stimulable phosphor sheets, and an operation for reading out a radiation image from a stimulable phosphor sheet, which is among the at least three stimulable phosphor sheets and on which a radiation image of an object has been recorded previously, is performed simultaneously with said operation for recording the radiation images of the object by utilizing the two stimulable phosphor sheets, which are among the at least three stimulable phosphor sheets.

11. An apparatus as defined in claim 9 or 10 wherein, in the image read-out section, an addition ratio of the front surface side image signal in the addition process, which is performed on the front surface side image signal and the back surface side image signal having been detected from the first stimulable phosphor sheet, is set at a value higher than an addition ratio of the front surface side image signal in the addition process, which is performed on the front surface side image signal and the back surface side image signal having been detected from the second stimulable phosphor sheet, and the first image signal and the second image signal are thereby obtained.

12. The method of claim 1, wherein said addition process performed on the side image signals detected from the second stimulable phosphor sheet, includes an addition ratio predetermined and set such that noise is suppressed.

13. The apparatus of claim 8, wherein said addition process performed on the side image signals detected from the second stimulable phosphor sheet, includes an addition ratio predetermined and set such that noise is suppressed.

14. An energy subtraction processing method, wherein at least three stimulable phosphor sheets, each of which allows detection of two image signals from their opposite surfaces, are superposed one upon the other with an energy separation filter, which absorbs low energy components of radiation, intervening therebetween and are then exposed simultaneously to radiation carrying image information of an object, and wherein a subtraction process is performed on a first image signal, which has been detected by reading out a first radiation image having been stored on a first stimulable phosphor sheet, and a second image signal, which has been detected by reading out a second radiation image having been stored on a second stimulable phosphor sheet located on the side remote from the object, an energy subtraction image signal being thereby obtained, the method comprising the steps of:

i) performing an addition process on a front surface side image signal, which has been detected by reading out the second radiation image from a front surface of the second stimulable phosphor sheet, and a back surface side image signal, which has been detected by reading out the second radiation image from a back surface of the second stimulable phosphor sheet, in order to obtain the second image signal, ii) performing the subtraction process on the first image signal and the thus obtained second image signal, wherein an operation for recording the radiation images is performed by utilizing two of said at least three stimulable phosphor sheets, and an operation for reading out a radiation image from one of said at least three stimulable phosphor sheets is performed simultaneously with said recording operation.

15. An energy subtraction processing apparatus, comprising:

i) an image recording section for simultaneously exposing at least three stimulable phosphor sheets, each of which allows detection of two image signals from their opposite surfaces, to radiation carrying information of an object in order to record radiation images of the object respectively on the stimulable phosphor sheets, the image recording section being constituted such that an energy separation filter, which absorbs low energy components of radiation, intervenes between each of said at least three stimulable phosphor sheets, ii) an image read-out section for reading out a first radiation image from a first stimulable phosphor sheet in order to obtain a first image signal, reading out a second radiation image from a front surface and a back surface of a second stimulable phosphor sheet in order to obtain a front surface side image signal and a back surface side image signal, and performing an addition process on the front surface side image signal and the back surface side image signal in order to obtain a second image signal, and iii) an operation processing section for performing a subtraction process on the first image signal and the second image signal in order to obtain an energy subtraction image signal, wherein an operation for recording the radiation images of the object is performed by utilizing two of said at least three stimulable phosphor sheets, and an operation for reading out a radiation image from one of said at least three stimulable phosphor sheets, on which a radiation image of an object has been recorded previously, is performed simultaneously with said operation for recording the radiation images.

16. The method of claim 2, wherein a signal-to-noise ratio of the energy subtraction image is based on at least one of an energy separation of the first and second stimulable phosphor sheets and an improved signal-to-noise ratio of the image signal of the first stimulable phosphor sheet.

17. The method of claim 3, wherein a signal-to-noise ratio of the energy subtraction image is based on at least one of an energy separation of the first and second stimulable phosphor sheets and an improved signal-to-noise ratio of the image signal of the first stimulable phosphor sheet.

* * * * *